Sept. 6, 1938. H. ROSENBERG 2,129,505
DAMPER CONTROL DEVICE
Filed Aug. 18, 1937
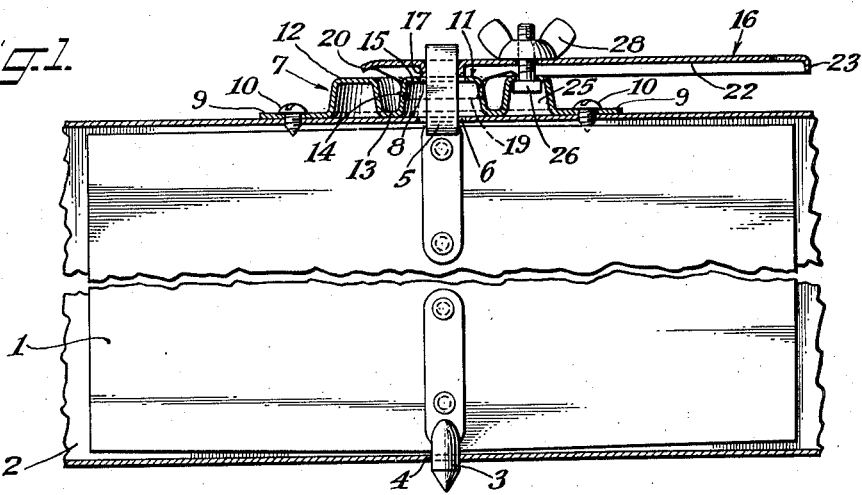
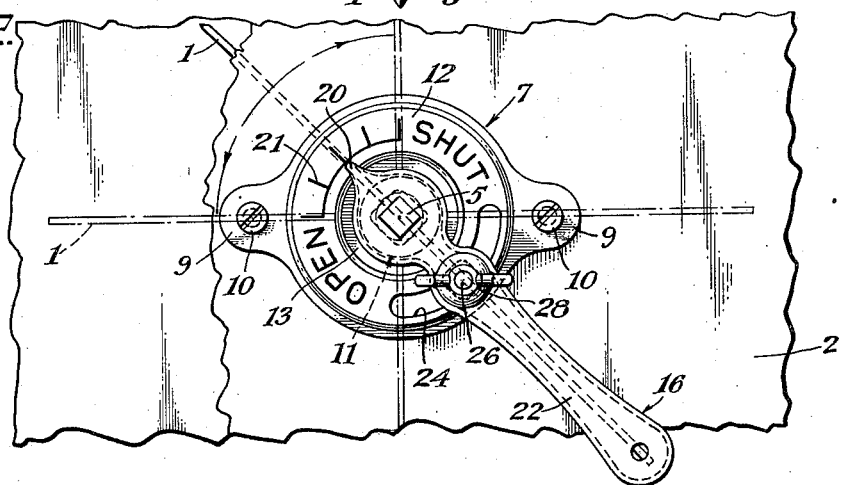
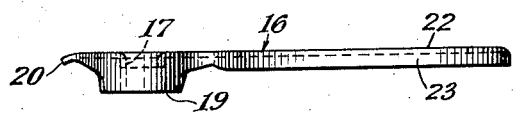
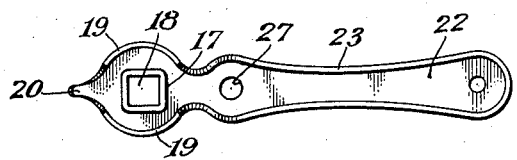
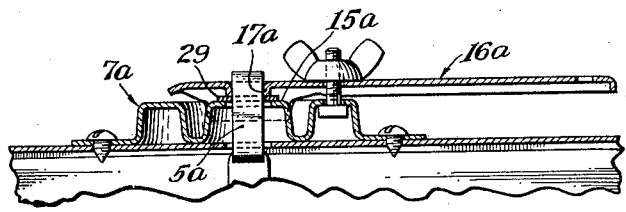
INVENTOR
Heyman Rosenberg
BY
Clarence M. Crews
ATTORNEYS Patented Sept. 6, 1938

2,129,505

UNITED STATES PATENT OFFICE 2,129,505

DAMPER CONTROL DEVICE

Heyman Rosenberg, New York, N. Y.

Application August 18, 1937, Serial No. 159,703

4 Claims. (Cl. 126—295)

This invention relates to damper control devices for regulating the flow of air or other gaseous fluid, either hot or cold, in ducts, and more particularly to dampers of the dial type as disclosed in Letters Patent of the United States No. 2,081,307, granted to me on May 25, 1937. The present invention is particularly directed to improvements upon the invention disclosed and claimed in my pending application Serial No. 82,043, filed May 27, 1936, for Damper control dial, now Patent No. 2,114,115, said application and resulting patent being a division of the application upon which my Patent No. 2,081,307 was granted.

In accordance with the disclosure of the last referred to patent and of my pending application, provision is made of a damper blade having a non-circular stem attached to it and protruding through a side of the duct in which the damper is mounted. The non-circular stem extends through circular openings in the duct wall and in a dial attached to the outer face of the duct wall, and carries upon its outer end a handle whereby the damper can be turned. Provision is made of means for securing the handle in different adjusted positions as desired. The non-circular stem has some freedom of play in the round openings, so that binding would occur when readjusting the damper but for the fact that the dial plate is formed with a central boss having a sloping outer face, and that the handle is provided on its lower face with an annular flange having an inner surface adapted to seat against, and have bearing engagement with, the central boss of the dial plate.

The present invention has in common with the patent and application disclosure referred to, the provision of a handle and a dial having cooperating bearing members for providing a steady bearing for the damper stem and the handle.

It is an object of the present invention to improve upon the handle of the prior disclosure by providing a unitary handle of sheet metal construction having downturned flanges for cooperating with the dial boss, a unitary pointer for cooperating with the dial scale, and a square central flange to provide an elongated surface for engaging the four sides of the square stem of the damper.

It is a further object of the invention to provide clamping means in association with the handle and dial and, in connection therewith, to form the handle with depending, reinforcing flange members for bearing against the dial, to localize the pressure between the handle and the dial and thereby enable the handle to be locked in place by the exercise of only a very moderate clamping force.

Other objects and advantages will hereinafter appear.

In the drawing forming part of this specification and illustrating certain practical advantageous embodiments of the invention:

Figure 1 is a fragmentary view in sectional elevation, partly broken away, illustrating a portion of a duct and damper with a control device embodying features of the invention applied thereto;

Figure 2 is a fragmentary plan view of the structure illustrated in Figure 1;

Figure 3 is a view in side elevation illustrating the damper handle employed in the construction of Figures 1 and 2;

Figure 4 is a bottom plan view of the handle of Figure 3; and

Figure 5 is a fragmentary view in sectional elevation illustrating a modified form of construction.

In Figures 1 and 2 a damper 1 is shown mounted in a duct 2 with the damper axis extending across the middle portion of the duct. The damper has attached to it a cylindrical bearing 3 which snugly fits a circular opening 4 formed in a wall of the duct 2. The damper also has secured to it a square stem 5 which extends through a circular opening 6 in the opposite side of the duct and which is disposed in axial alignment with the bearing 3.

A dial plate 7 is secured upon the outer side of the duct, the dial plate being provided with a circular central opening 8 in alignment with the openings 4 and 6. The dial plate 7 is provided with ears 9 for attachment to the duct, and attachment may be effected by the insertion of hardened "sheet metal" screws 10 through the ears 9 and the duct wall. The dial as viewed from above comprises a central boss 11 and an outer circular boss 12 with an intervening annular channel 13 between them. The lateral wall 14 of the central circular boss slopes upwardly and inwardly from the base of the channel 13, being generally of frusto-conical form but being rounded at its upper end and merging into an inturned flat upper surface 15.

The damper handle 16 is a stamping formed from a single piece of sheet metal. The damper handle 16 is provided with a square depending flange 17 which defines a square opening 18 adapted to have a snug sliding fit with the square stem 5 of the damper and to extend for a substantial distance lengthwise of the stem. The flange 17 is adapted to bear against the upper surface 15 of the central boss 11 of the dial plate. At opposite sides of the flange 17 the handle is formed with downwardly extending arcuate flanges 19 which are concentric with the midpoint of the opening 18. The flanges 19 are adapted to cooperate with the sloping wall 14 of the central boss 11 and thus serve to provide an extensive steady bearing for the handle. At one end the handle is provided with an integral pointer or finger 20 for cooperating with a scale 21 formed on the upper face of the dial plate base 12.

The handle proper 22, that is, the operating portion of the handle, is located diametrically opposite the pointer 20 and extends outwardly from the opening 18 for a considerable distance, it being desirably provided continuously with a short, downturned flange 23 which stiffens the handle and also serves to present smooth side surfaces for engagement by the hand.

The outer circular boss 12 of the dial plate has an arcuate slot 24 provided through a portion of the top thereof, the slot opening into an annular channel 25 formed in the boss at the lower side of the dial plate. A square-headed bolt 26 is disposed with its head lying in and filling the width of the channel 25 and with its threaded shank extending upward through the slot 24 and through an opening 27 in the handle 16. A wing nut 28 is threaded upon the upper end of the bolt 26 and may be turned either to clamp the handle 16 in an adjusted position or to unclamp the handle so as to permit adjustment thereof. Rotation of the bolt is prevented by engagement of the sides of its head with the walls of the channel 25.

It will be seen that the handle is of extremely simple and inexpensive construction. It will be further observed that it provides in a single structure a square central flange having substantial engagement with the damper stem in the direction of the length thereof, a pointer for cooperating with the dial, and a pair of cooperating bearing flanges for preventing binding, together with a reinforced operating portion which carries the handle locking means.

The flange 32, moreover, includes sections at opposite sides of the handle for bearing against the dial. These flange sections space the intervening handle portion away from the dial, causing the clamping pressure to be localized and to be exerted, not by direct thrust but through the somewhat deformable portion of the handle which is spaced away from the dial. The clamping pressure may, therefore, be applied and released with greater facility than in prior constructions.

The embodiment of Figure 5 is in all respects the same as that of Figures 1 to 4, with the exception that a sealing gasket 29 is interposed between the lower face of the square flange of the handle and the upper face of the central boss of the dial plate. This gasket may be of any suitable heat resisting and wear resisting material and is desirably formed as a flat round washer having a square central opening for fitting the square stem of the damper. Since the parts, with the exception of the gasket, are all the same as the corresponding parts of Figures 1 and 2, corresponding reference numerals have been applied with the subscript "a" added in each instance, and no further description of the parts will be given.

While I have illustrated and described in detail certain advantageous forms of my invention, it is to be noted that changes may be made therein and the invention embodied in other structures. I do not, therefore, desire to limit myself to the specific constructions illustrated, but intend to cover my invention broadly in whatever form its principle may be utilized.

I claim:

1. In a damper, the combination with a damper blade and a square stem therefor, of a dial plate having a central circular opening through which the damper stem passes and a central boss surrounding the opening and formed with a sloping external bearing wall, of a handle for the damper stem having sliding engagement with the stem and formed as a unitary sheet metal stamping, said handle including a pointer for cooperating with the dial plate, a square flange slidingly fitting the damper stem and having extended engagement with the stem, opposed depending arcuate flange segments for cooperating with the dial plate boss to guide and steady the handle, and a flange reinforced operating portion extending outward beyond the dial plate.

2. In a damper, the combination with a damper blade and a square stem therefor, of a dial plate having a central circular opening through which the damper stem passes and a central boss surrounding the opening and formed with a sloping external bearing wall, of a handle for the damper stem having sliding engagement with the stem and formed as a unitary sheet metal stamping, said handle including a pointer for cooperating with the dial plate, a square flange slidingly fitting the damper stem and having extended engagement with the stem, opposed depending arcuate flange segments for cooperating with the dial plate boss to guide and steady the handle, an operating portion extending outward across the dial plate, and depending flanges reinforcing the operating portion of the handle and resting on the dial plate, and clamping means carried by the handle and including a clamping bolt which passes through a portion of the dial plate for pressing said reinforcing flanges into gripping engagement with the dial plate.

3. In a damper, the combination with a damper blade and a stem therefor, of a dial plate having a central opening through which the damper stem passes, said dial plate including an annular boss having an arcuate slot through the upper face thereof, a handle having an opening fitting the damper stem, and including an operating portion extending outward across the annular boss, depending flanges formed at opposite sides of the portion which extends across the annular boss, a headed bolt having its head imprisoned in the annular boss and its shank extending upward through the slot and through the handle, and clamping means cooperating with the bolt to press the handle flanges firmly down against the annular boss to fix the handle against movement.

4. In a damper, the combination with a damper blade and a square stem therefor, of a dial plate having a central circular opening through which the damper stem passes and a central boss surrounding the opening and formed with a sloping external bearing wall, of a handle for the damper stem having sliding engagement with the stem and formed as a unitary sheet metal stamping, said handle including a pointer for cooperating with the dial plate, a square flange slidingly fitting the damper stem and having extended engagement with the stem, opposed depending arcuate flange segments for cooperating with the dial plate boss to guide and steady the handle and a flange reinforced operating portion extending outward beyond the dial plate, and a sealing gasket interposed between the lower face of the square flange of the handle and the upper face of the central boss of the dial plate for preventing leakage of gas through the central opening of the dial plate, said gasket having a square, stem-fitting hole, and adapted to bear continuously at its inner margin against the square flange boss, and in an annular area surrounding said inner margin against the dial plate boss.

HEYMAN ROSENBERG.